(12) United States Patent
Park et al.

(10) Patent No.: US 8,977,983 B2
(45) Date of Patent: Mar. 10, 2015

(54) TEXT ENTRY METHOD AND DISPLAY APPARATUS USING THE SAME

(75) Inventors: Mi-ju Park, Seoul (KR); Yong-hwan Kwon, Seongnam-si (KR); Sang-hee Lee, Seoul (KR); Won-il Kim, Gwacheon-si (KR); Yeo-ri Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 12/432,992

(22) Filed: Apr. 30, 2009

(65) Prior Publication Data

US 2010/0088616 A1    Apr. 8, 2010

(30) Foreign Application Priority Data

Oct. 6, 2008  (KR) .................. 10-2008-0097805

(51) Int. Cl.
G06F 3/048 (2013.01)
G06F 17/24 (2006.01)
G06F 3/023 (2006.01)
G06F 3/0489 (2013.01)
H04L 12/58 (2006.01)
H04N 21/462 (2011.01)

(52) U.S. Cl.
CPC ............ *G06F 17/248* (2013.01); *G06F 3/0236* (2013.01); *G06F 3/0489* (2013.01); *H04L 12/581* (2013.01); *H04L 51/04* (2013.01); *H04N 21/4622* (2013.01)
USPC ........................................................ 715/810

(58) Field of Classification Search
CPC .... G06F 3/0236; G06F 3/0489; G06F 17/248
USPC ............................................................. 715/810
See application file for complete search history.

(56) References Cited

U.S. PATENT DOCUMENTS

| | | | |
|---|---|---|---|
| 6,987,991 B2 * | 1/2006 | Nelson ..................... | 455/566 |
| 7,167,731 B2 * | 1/2007 | Nelson ..................... | 455/566 |
| 7,363,591 B2 * | 4/2008 | Goldthwaite et al. ..... | 715/763 |
| 7,908,554 B1 * | 3/2011 | Blattner ................... | 715/706 |
| 8,375,327 B2 | 2/2013 | Lorch et al. | |
| 2004/0018858 A1 * | 1/2004 | Nelson ..................... | 455/566 |
| 2004/0140995 A1 * | 7/2004 | Goldthwaite et al. ..... | 345/716 |
| 2005/0156873 A1 * | 7/2005 | Walter et al. ............. | 345/156 |
| 2005/0181777 A1 * | 8/2005 | Kim ......................... | 455/418 |
| 2006/0010240 A1 * | 1/2006 | Chuah ....................... | 709/228 |

(Continued)

FOREIGN PATENT DOCUMENTS

| | | |
|---|---|---|
| EP | 1 215 867 A2 | 6/2002 |
| JP | 2008-527563 A | 7/2008 |

(Continued)

OTHER PUBLICATIONS

Communication dated Jul. 25, 2014 issued by the Korean Intellectual Property Office in counterpart Korean Patent Application No. 10-2008-0097805.

*Primary Examiner* — William Bashore
*Assistant Examiner* — Henry Orr
(74) *Attorney, Agent, or Firm* — Sughrue Mion PLLC

(57) ABSTRACT

A text entry method and a display apparatus applying the same are provided. In the text entry method, one emoticon is selected from an emoticon set, and a text string corresponding to the selected emoticon is then entered. Therefore, it is possible for a user to enter text more conveniently.

22 Claims, 11 Drawing Sheets

(56) References Cited

U.S. PATENT DOCUMENTS

| | | | |
|---|---|---|---|
| 2006/0015812 A1* | 1/2006 | Cunningham et al. | 715/535 |
| 2006/0025220 A1* | 2/2006 | Macauley et al. | 463/42 |
| 2006/0053386 A1* | 3/2006 | Kuhl et al. | 715/773 |
| 2006/0079293 A1* | 4/2006 | Nelson | 455/566 |
| 2006/0282503 A1* | 12/2006 | Gwozdz | 709/206 |
| 2007/0033259 A1* | 2/2007 | Wies et al. | 709/206 |
| 2007/0261006 A1* | 11/2007 | Reissmueller et al. | 715/837 |
| 2008/0114848 A1* | 5/2008 | Lira | 709/206 |
| 2008/0216022 A1 | 9/2008 | Lorch et al. | |
| 2008/0244446 A1* | 10/2008 | LeFevre et al. | 715/810 |
| 2008/0256040 A1* | 10/2008 | Sundaresan et al. | 707/3 |
| 2009/0019117 A1* | 1/2009 | Bonforte et al. | 709/206 |
| 2010/0030578 A1* | 2/2010 | Siddique et al. | 705/3 |
| 2013/0254678 A1 | 9/2013 | Lorch et al. | |

FOREIGN PATENT DOCUMENTS

| | | |
|---|---|---|
| KR | 10-0474014 B1 | 2/2005 |
| KR | 10-2006-0031715 A | 4/2006 |
| KR | 10-2007-0077817 A | 7/2007 |
| WO | 03/017681 A2 | 2/2003 |
| WO | 03/039169 A1 | 5/2003 |
| WO | 2006/075334 A2 | 7/2006 |

* cited by examiner

TEXT ENTRY METHOD AND DISPLAY APPARATUS USING THE SAME

CROSS-REFERENCE TO RELATED APPLICATIONS

This application claims priority from Korean Patent Application No. 10-2008-0097805, filed on Oct. 6, 2008, in the Korean Intellectual Property Office, the disclosure of which is incorporated herein by reference in its entirety.

BACKGROUND OF THE INVENTION

1. Field of the Invention

Methods and apparatuses consistent with the present invention relate to entering text and providing a display apparatus, and more particularly, to entering text on a display apparatus using an input device, such as a remote controller, and providing a display apparatus.

2. Description of the Related Art

Recent technological developments in the field of televisions (TVs) have enabled users to access a greater variety of services than previously. Since TVs are able to be connected to the Internet, users can receive messages from or send messages to other users, or chat with each other.

To use messaging services or chatting services with a TV, users need to enter characters using a remote controller. However, it is difficult for users to enter characters, as TVs do not have input devices designed for text entry, such as keyboards.

Additionally, users need to enter text rapidly when using electronic products equipped with display apparatuses other than TVs, such as personal digital assistants (PDAs) or mobile phones.

Users desire to enter text more conveniently and rapidly. Therefore, there is a need for methods for users to enter text more conveniently.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for entering text corresponding to an emoticon selected from an emoticon set in order for a user to enter text more conveniently, and a display apparatus applying the method.

According to an aspect of the present invention, there is provided a text entry method comprising displaying an emoticon set, and if one emoticon is selected from the emoticon set, entering a text string corresponding to the selected emoticon.

The text entry method may further comprise, if one emoticon is selected from the emoticon set, displaying one or more text strings corresponding to the selected emoticon on a screen. The entering may comprise entering a text string selected from among the one or more text strings.

The text entry method may further comprise, if one emoticon is selected from the emoticon set, displaying a plurality of text sets corresponding to the selected emoticon on a screen; and if one text set is selected from among the plurality of text sets, displaying one or more text strings contained in the selected text set on a screen. The entering may comprise entering a text string selected from among the one or more text strings.

Each of the plurality of text sets may comprise one or more text strings, and may be edited by a user and uploaded and downloaded via a network.

The text entry method may further comprise displaying a cursor inside the emoticon set; and displaying one or more text strings corresponding to an emoticon to which the cursor points on a screen. The entering may comprise entering a text string selected from among the one or more text strings.

The text entry method may further comprise, if the entered text string is edited, storing the edited text string to be associated with the selected emoticon.

The text entry method may further comprise storing a plurality of emoticon sets available for each of a plurality of users. The displaying may comprise displaying an emoticon set available for a current user.

A plurality of text strings corresponding to a single emoticon may be provided so as to be available for each of a plurality of users. The entering may comprise entering a text string which is available for a current user and corresponds to the selected emoticon.

The text entry method may further comprise receiving broadcast information; and extracting genre information on a genre to which a broadcast program belongs from the broadcast information. The entering may comprise entering a text string, which corresponds to the genre information and the selected emoticon.

The entering may comprise entering the selected emoticon along with the text string corresponding to the selected emoticon.

The text entry method may further comprise receiving data regarding the selected emoticon and data regarding the text string via a network.

According to another aspect of the present invention, there is provided a display apparatus comprising a display unit which displays an emoticon set; and a controller which, if one emoticon is selected from the emoticon set, enters a text string corresponding to the selected emoticon.

If one emoticon is selected from the emoticon set, the controller may control one or more text strings corresponding to the selected emoticon to be displayed on a screen, and may enter a text string selected from among the one or more text strings.

If one emoticon is selected from the emoticon set, the controller may control a plurality of text sets corresponding to the selected emoticon to be displayed on a screen. If one text set is selected from among the plurality of text sets, the controller may control one or more text strings contained in the selected text set to be displayed on a screen. The controller may enter a text string selected from among the one or more text strings.

Each of the plurality of text sets may comprise one or more text strings, and may be edited by a user and uploaded and downloaded via a network.

The controller may control such that a cursor may be displayed inside the emoticon set and such that one or more text strings corresponding to an emoticon to which the cursor points may be displayed on a screen, and may enter a text string selected from among the one or more text strings.

If the entered text string is edited, the controller may control the edited text string to be stored so as to be associated with the selected emoticon.

The display apparatus may further comprise a storage unit which stores a plurality of emoticon sets available for each of a plurality of users. The controller may control an emoticon set available for a current user to be displayed.

A plurality of text strings corresponding to a single emoticon may be provided so as to be available for each of a plurality of users. The controller may enter a text string which is available for a current user and corresponds to the selected emoticon.

The display apparatus may further comprise a broadcast receiver which receives broadcast information. The controller may extract genre information on a genre to which a broadcast program belongs from the broadcast information, and may enter a text string, which corresponds to the genre information and the selected emoticon.

The controller may enter the selected emoticon along with the text string corresponding to the selected emoticon.

The display apparatus may further comprise a network interface which receives data regarding the selected emoticon and data regarding the text string via a network.

According to another aspect of the present invention, there is provided a text entry method comprising displaying an image set containing one or more images; if one image is selected from the image set, displaying one or more text strings corresponding to the selected image; and entering a text string selected from among the one or more text strings.

According to another aspect of the present invention, there is provided a display apparatus comprising a display unit which displays an image set containing one or more images; and a controller which, if one image is selected from the image set, controls one or more text strings corresponding to the selected image to be displayed on a screen, and which enters a text string selected from among the one or more text strings.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
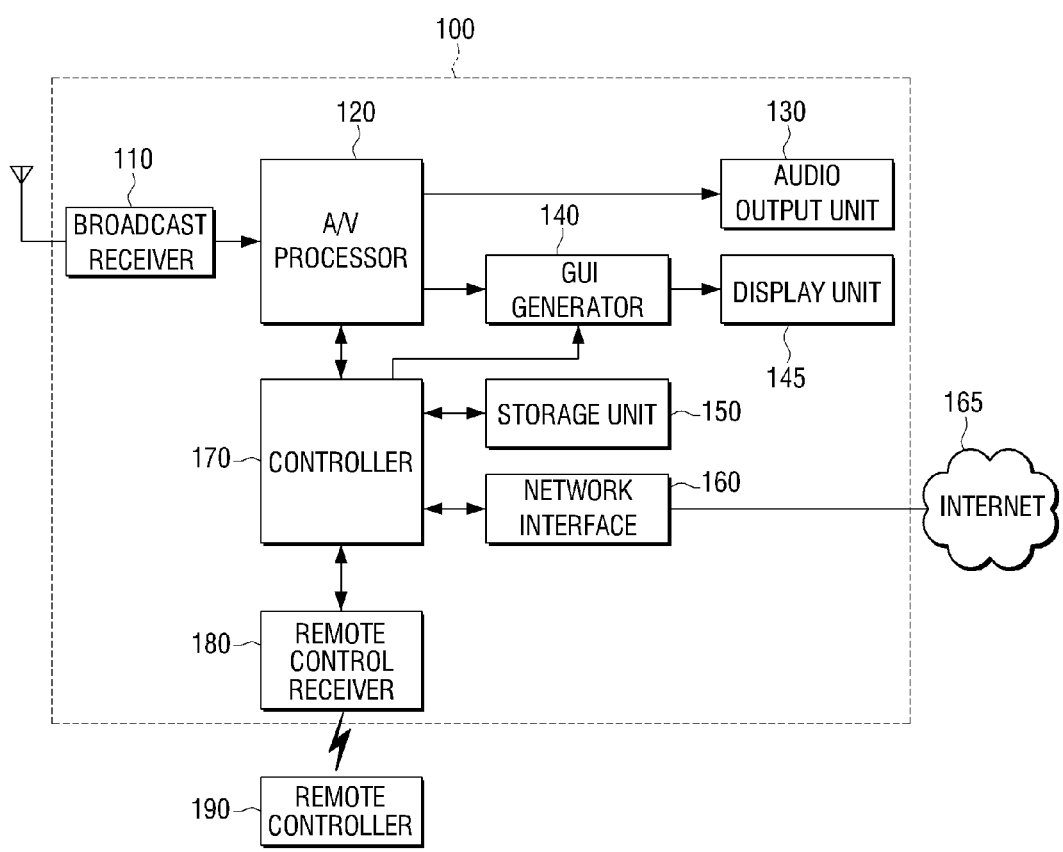
FIG. 1 is a block diagram of a television (TV) according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a television (TV) 100 according to an exemplary embodiment of the present invention. The TV 100 of FIG. 1 comprises a broadcast receiver 110, an audio/video (AV) processor 120, an audio output unit 130, a graphical user interface (GUI) generator 140, a display unit 145, a storage unit 150, a network interface 160, a controller 170, a remote control receiver 180 and a remote controller 190.

The broadcast receiver 110 receives a broadcast via a wired or wireless connection from a broadcasting station or satellite, and demodulates the received broadcast. The broadcast receiver 110 receives broadcast information containing electronic program guide (EPG) information regarding a broadcast program.

The A/V processor 120 performs signal processing such as video decoding, video scaling, and audio decoding of a video signal and an audio signal output from the broadcast receiver 110 and the controller 170. Additionally, the A/V processor 120 transmits the video signal to the GUI generator 140, and the audio signal to the audio output unit 130, respectively.

Alternatively, the A/V processor 120 outputs the video and audio signals in compressed format to the storage unit 150 so that the compressed video and audio signals are stored in the storage unit 150.

The audio output unit 130 may output audio signals transmitted from the A/V processor 120 through a speaker, or may output audio signals through an external output terminal connected to an external speaker.

The GUI generator 140 generates a GUI to be provided to a user. The GUI generated by the GUI generator 140 may comprise a GUI for an on-screen-display (OSD) menu and a GUI for OSD items. Additionally, the GUI generator 140 generates an emoticon set to be displayed in OSD form on a screen of the TV 100.

Herein, the emoticon set refers to an emoticon list containing a plurality of emoticons. A plurality of emoticon sets may be stored separately for each user. Accordingly, each user may set his or her own emoticon set by selecting an emoticon set containing desired emoticons.

An emoticon is a portmanteau of the English words emotion (or emote) and icon. An emoticon may be formed by a combination of characters, symbols and numbers on a computer keyboard, or may be displayed in image form, in order to convey an emotion or intention in cyber space.

The display unit 145 displays a video output from the A/V processor 120. Additionally, the display unit 145 displays a video on which an OSD associated with the emoticon set generated by the GUI generator 140 is superimposed.

The storage unit 150 records multimedia content received by the broadcast receiver 110 and stores the recorded multimedia content. Additionally, the storage unit 150 stores multimedia files received via the network interface 160.

The storage unit 150 stores a plurality of emoticon sets available for each of a plurality of users. In this situation, each of the plurality of emoticon sets contains a plurality of emoticons, each of which corresponds to one or more text strings. Accordingly, the storage unit 150 may also store one or more text strings corresponding to a single emoticon, so that the one or more text strings may be used by each of the plurality of users. In other words, the storage unit 150 stores the plurality of emoticon sets and the one or more text strings corresponding to a single emoticon for each user.

Furthermore, the storage unit 150 stores a plurality of text sets. Each of the plurality of text sets contains one or more text strings corresponding to a single emoticon, and is available for each user. The plurality of text sets may be edited by each user or may be uploaded or downloaded via a network.

The storage unit 150 functioning as described above may be implemented as a hard disc drive (HDD) or a nonvolatile memory.

The network interface 160 functions as a connection path to perform communication between the TV 100 and the Internet 165. In more detail, the network interface 160 communicably connects the TV 100 to a communication network such as the Internet 165.

Additionally, the network interface 160 receives emoticon data and text data from an external server via a network. Accordingly, the TV 100 may display emoticons and text strings on the screen using emoticon data and text data stored in the storage unit 150, or using the emoticon data and text data received via the network interface 160.

The remote control receiver 180 receives user operation information from the remote controller 190 and transmits the user operation information to the controller 170.

The controller 170 checks user commands based on the user operation information received from the remote control receiver 180, and controls the entire operation of the TV 100 according to the user commands.

More specifically, if a single emoticon is selected from the emoticon set, the controller 170 determines a text string corresponding to the selected emoticon. For example, if a user selects an emoticon from an emoticon set displayed on the screen using directional keys on the remote controller 190, the controller 170 may determine a text string corresponding to the selected emoticon and control the determined text string to be displayed on a text input window.

Herein, the text string refers to a character string comprising one or more characters. In the exemplary embodiment of the present invention, the text string comprises words, expressions, phrases and sentences.

If a single emoticon is selected from the emoticon set, the controller 170 controls one or more text strings corresponding to the selected emoticon to be displayed on the screen. Additionally, the controller 170 determines one text string selected by a user from among the one or more text strings displayed on the screen, and controls the selected text string to be displayed in the text input window.

As different users are able to associate a single emoticon with different text strings, the controller 170 may control various text strings corresponding to a single emoticon to be displayed.

In more detail, the controller 170 controls such that a cursor is displayed inside the emoticon set and such that one or more text strings corresponding to an emoticon indicated by the cursor are displayed on the screen. For example, if a user moves the cursor on the screen to select a desired emoticon using the directional keys on the remote controller 190, one or more text strings corresponding to an emoticon to which the cursor points may be displayed instantly on the screen. Accordingly, it is possible for the user to easily know the text string corresponding to the selected emoticon.

Additionally, if a single emoticon is selected from the emoticon set, the controller 170 controls a plurality of text sets corresponding to the selected emoticon to be displayed on the screen. In this situation, if one text set is selected from the plurality of text sets, the controller 170 controls such that one or more text strings contained in the selected text set appear on the screen and such that a text string selected from among the one or more text strings is displayed in the text input window.

Since there are a plurality of text sets for each user, each user may form his or her own desired text set and use the text set. Additionally, each user may edit his or her own text set, and may upload or download a desired text set over a network.

If a user edits the displayed text string in the text input window, the controller 170 controls the edited text string to be stored so as to be associated with the selected emoticon. In more detail, if a user edits the text string displayed in the text input window by selecting the emoticon and determines the edited text string to be a final text string, the controller 170 allows the final text string to be added to a plurality of text strings corresponding to the selected emoticon. As described above, the edited text string may be newly added so as to be associated with the selected emoticon, and it is thus possible to match text strings which are typically typed by the user to the selected emoticon.

The controller 170 controls an emoticon set available for a current user to be displayed on the screen. The storage unit 150 stores a plurality of emoticon sets available for each of a plurality of users, as described above, and accordingly the controller 170 may provide the current user with a matching emoticon set.

The controller 170 may determine who the current user is in various ways. For example, the controller 170 may require that the current user enter his or her identification (ID) when he or she turns on the TV 100, and may then control an emoticon set corresponding to the entered ID to be displayed on the screen.

If a user enters an emoticon set display command using the remote controller 190, the controller 170 displays a user list on the screen first. In this situation, the controller 170 may also display an emoticon set available for a user selected from the user list on the screen.

As described above, the controller 170 may control the plurality of emoticon sets to be displayed individually for each user.

Furthermore, the controller 170 determines a text string corresponding to an emoticon selected by the user. In this situation, a plurality of text strings corresponding to a single emoticon may be provided so as to be available for each of the plurality of users. In other words, the storage unit 150 stores a plurality of text strings corresponding to a single emoticon for each user. This is because a text string suitable for each user may match a single emoticon as each of the plurality of users may use different expressions.

The controller 170 determines who the current user is in various ways, as described above. If the current user selects a single emoticon, the controller 170 may control a text string available to the current user to be displayed on the screen.

The controller 170 extracts genre information on a genre to which a broadcast program belongs from the broadcast information received by the broadcast receiver 110, and determines the text string corresponding to the selected emoticon into the extracted genre information. A user may desire that various text strings corresponding to a single emoticon be determined according to the genre of a currently viewed broadcast program. Accordingly, the storage unit 150 may store a plurality of text strings for a single emoticon according to the genre. Additionally, if the user selects a single emoticon, the controller 170 determines a text string corresponding to the genre of the currently viewed broadcast program among a plurality of text strings corresponding to the selected emoticon, and displays the determined text string in the text input window of the screen.

In this situation, the controller 170 may also display both the text string and the selected emoticon in the text input window of the screen.

As described above, if the TV 100 displays the emoticon set on the screen, the user selects one emoticon from the displayed emoticon set so that a desired text string may be entered. Thus, it is possible for the user to enter desired text more easily.

Figure 2:
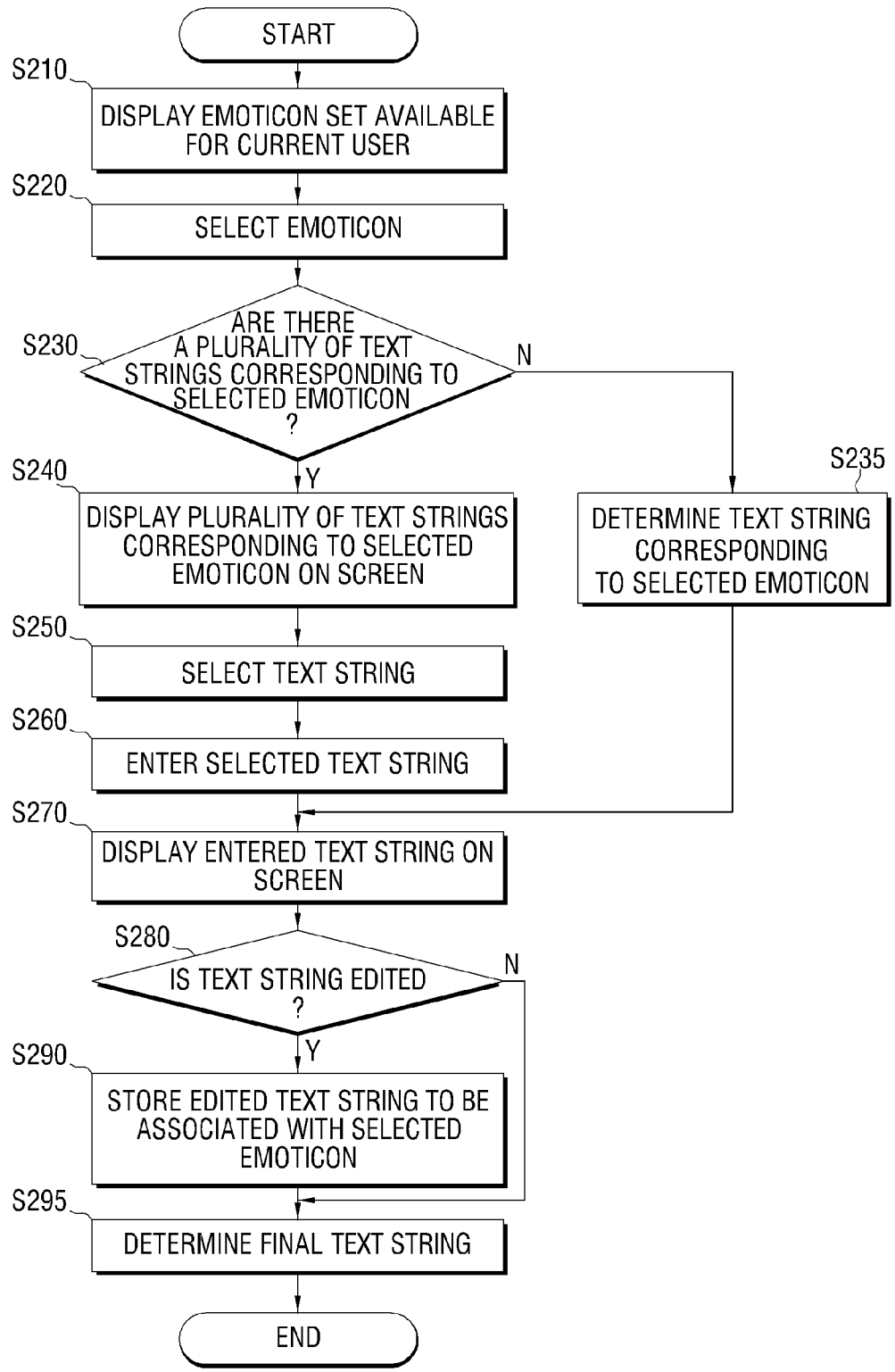
FIG. 2 is a flowchart explaining a text entry method according to an exemplary embodiment of the present invention.

FIG. 2 is a flowchart explaining a text entry method according to an exemplary embodiment of the present invention.

If a user enters an emoticon set display command using the remote controller 190, the TV 100 displays an emoticon set available for the current user on the screen (S210). In this situation, the TV 100 may determine who the current user is in various ways. For example, if the user turns on the TV 100, the TV 100 may display an ID input window through which the user can enter his or her ID, and may then control an emoticon set corresponding to the entered ID to be displayed on the screen.

Additionally, in response to the emoticon set display command, the TV 100 may display a user list on the screen first. In this situation, the TV 100 may also display an emoticon set available for a user selected from the user list on the screen.

Data on the emoticon set, emoticon data and text data may be stored in the storage unit 150 of the TV 100, or may be received from an external server via the network over the Internet.

After operation S210, the user selects a single emoticon from the displayed emoticon set using the remote controller 190 (S220). More specifically, the TV 100 displays a cursor inside the displayed emoticon set. The user moves the cursor to a desired emoticon using the directional keys on the remote controller 190, and enters a selection command, so that the desired emoticon may be selected.

Subsequently, the TV 100 determines whether there are a plurality of text strings corresponding to the selected emoticon (S230). If it is determined that only a single text string corresponds to the selected emoticon (S230-N), the TV 100 determines the text string corresponding to the selected emoticon (S235), and displays the determined text string in the text input window of the screen (S270).

Alternatively, if it is determined that there are a plurality of text strings corresponding to the selected emoticon (S230-Y), the TV 100 displays the plurality of text strings corresponding to the selected emoticon on the screen (S240). The user selects a desired text string from among the plurality of text strings displayed on the screen using the remote controller 190 (S250). Accordingly, the TV 100 determines the text string selected by the user (S260), and displays the determined text string in the text input window of the screen (S270).

In operation S240, after the user selects one from the emoticon set, the TV 100 displays a plurality of text sets corresponding to the selected emoticon on the screen. Next, if the user selects one text set from among the plurality of text sets, the TV 100 displays one or more text strings contained in the selected text set on the screen. Additionally, the TV 100 enters a text string selected by the user from among the one or more text strings, and displays the determined text string in the text input window of the screen.

Since the plurality of text sets exist for each user, each user may form his or her own desired text set and use the text set. Additionally, each user may edit his or her own text set, and may upload or download a desired text set via the network.

In operation S260, the TV 100 determines a text string which is available for the user and corresponds to the selected emoticon.

Accordingly, a plurality of text strings corresponding to a single emoticon may be provided so as to be available for each of a plurality of users, as described above. In other words, the storage unit 150 stores a plurality of text strings corresponding to a single emoticon for each user. This is because a text string suitable for each user may match a single emoticon as each of the plurality of users may use different expressions.

Additionally, in operation S260, the TV 100 extracts genre information on a genre of a broadcast program from the broadcast information received by the broadcast receiver 110, and determines the text string corresponding to the selected emoticon into the extracted genre information. A user may desire that various text strings corresponding to a single emoticon be entered according to the genre of a currently viewed broadcast program. Accordingly, the storage unit 150 may store a plurality of text strings for a single emoticon according to the genre. Additionally, if the user selects a single emoticon, the TV 100 determines a text string corresponding to the genre of the currently viewed broadcast program among a plurality of text strings corresponding to the selected emoticon, and displays the determined text string in the text input window of the screen.

In this situation, the TV 100 may also determine the selected emoticon along with the corresponding text string, and may display both the text string and the selected emoticon in the text input window of the screen.

The TV 100 then determines whether the entered text string is edited in the text input window (S280). If it is determined that the text string is edited (S280-Y), the TV 100 stores the edited text string to be associated with the selected emoticon (S290).

In more detail, if the user edits the text string in the text input window according to selection of the emoticon and determines the edited text string to be a final text string, the TV 100 adds the final text string to be associated with the selected emoticon. As described above, the edited text string may be newly added so as to be associated with the selected emoticon, and it is thus possible to match text strings which are typically typed by the user to the selected emoticon.

The TV 100 determines the final text string (S295). The final text string may be transmitted as a message to other users, or may be used to chat with other users.

The operations described above enable the user to enter a text string corresponding to an emoticon by selecting the emoticon.

Hereinafter, examples of the screen of the TV 100 will be illustrated according to various exemplary embodiments of the present invention with reference to FIGS. 3 to 11.

Figure 3:
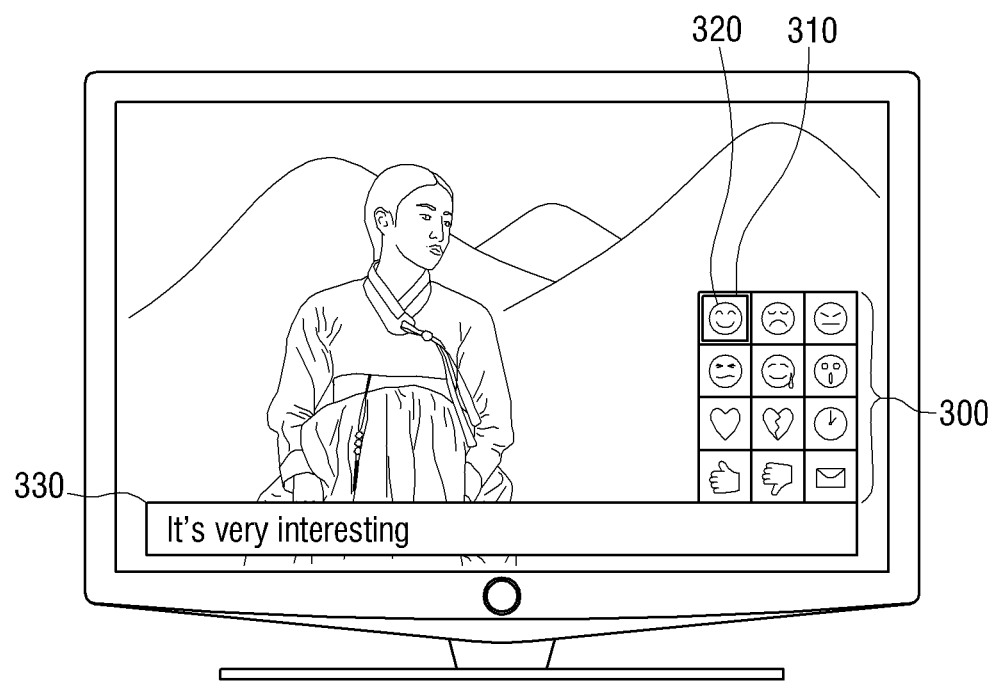
FIG. 3 illustrates a screen on which a text string corresponding to a first emoticon is entered when the first emoticon is selected, according to an exemplary embodiment of the present invention.

FIG. 3 exemplarily illustrates a screen of the TV 100 which displays a text string corresponding to a first emoticon 320 when a user selects the first emoticon 320. If the user enters the emoticon set display command, the TV 100 displays an emoticon set 300, a cursor 310 and a text input window 330 on the screen, as shown in FIG. 3.

The emoticon set 300 of FIG. 3 comprises twelve emoticons, and the cursor 310 currently corresponds to the first emoticon 320 as shown in FIG. 3. In this situation, if the user enters a selection command using the remote controller 190, text string 'It's very interesting' is displayed in the text input window 330. In other words, the user may enter the text string 'It's very interesting' by selecting the first emoticon 320.

The first emoticon 320 represents a smiley face, so the user may intuitively know that he or she needs to select the first emoticon 320 if desiring to enter a text string to express amusement or interest. Since emoticons express their respective meanings, the user may intuitively search for an emoticon corresponding to a text string which he or she desires to enter. Accordingly, the user can easily enter desired text using emoticons.

Figure 4:
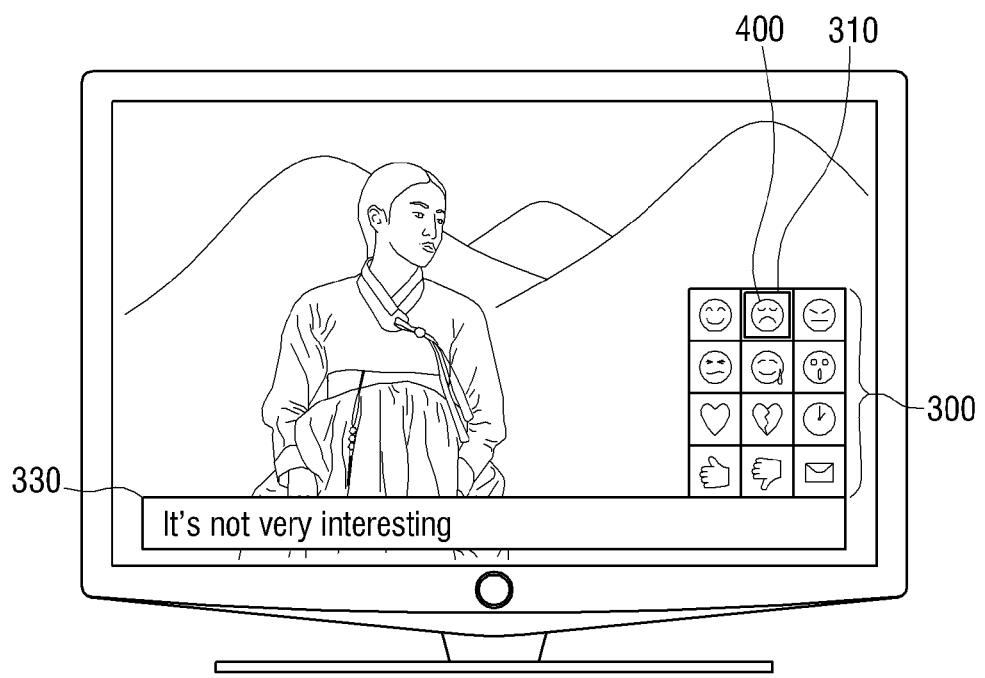
FIG. 4 illustrates a screen on which a text string corresponding to a second emoticon is entered when the second emoticon is selected, according to an exemplary embodiment of the present invention.

FIG. 4 exemplarily illustrates a screen of the TV 100 which displays a text string corresponding to a second emoticon 400 when a user selects the second emoticon 400.

If the user presses a right directional key on the remote controller 190 while the screen of FIG. 3 is displayed, the cursor 310 on the emoticon set 300 moves to the right so as to be placed on the second emoticon 400, as shown in FIG. 4.

If the user enters a selection command using the remote controller 190 when the cursor 310 currently indicates the second emoticon 400, text string 'It's not very interesting' is displayed in the text input window 330. Accordingly, it is understood that the second emoticon 400 corresponds to the text string 'It's not very interesting'.

Therefore, it is possible for the user to select a desired emoticon from the emoticon set 300 by moving the cursor 310 using the directional keys on the remote controller 190.

Figure 5:
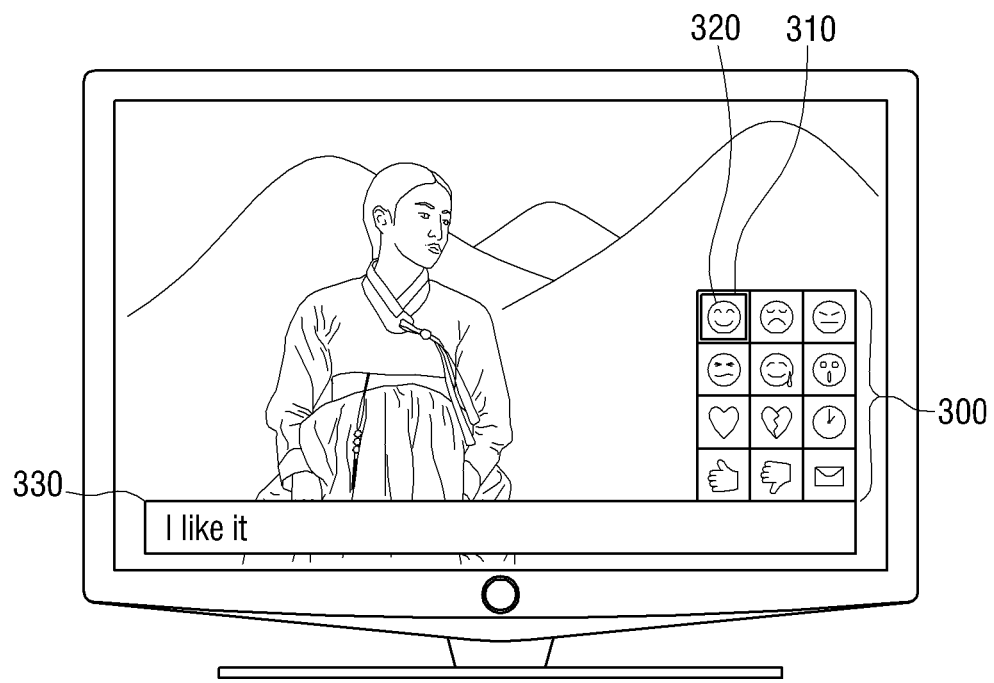
FIG. 5 illustrates a screen on which a text string corresponding to a first emoticon is entered when the first emoticon is selected by another user, according to an exemplary embodiment of the present invention.

FIG. 5 exemplarily illustrates a screen of the TV 100 which displays a text string corresponding to the first emoticon 320 when another user selects the first emoticon 320.

In the exemplary embodiment of the present invention, FIG. 3 illustrates a situation in which a first user uses the TV 100, and FIG. 5 illustrates a situation in which a second user uses the TV 100. The TV 100 may determine who the current user is using an entered ID or user information selected from the user list.

The first emoticon 320 of FIG. 3 corresponds to the text string 'It's very interesting', and the first emoticon 320 of FIG. 5 corresponds to the text string 'I like it'. Accordingly, the text string corresponding to a single emoticon may vary according to which user currently uses the TV 100.

Figure 6:
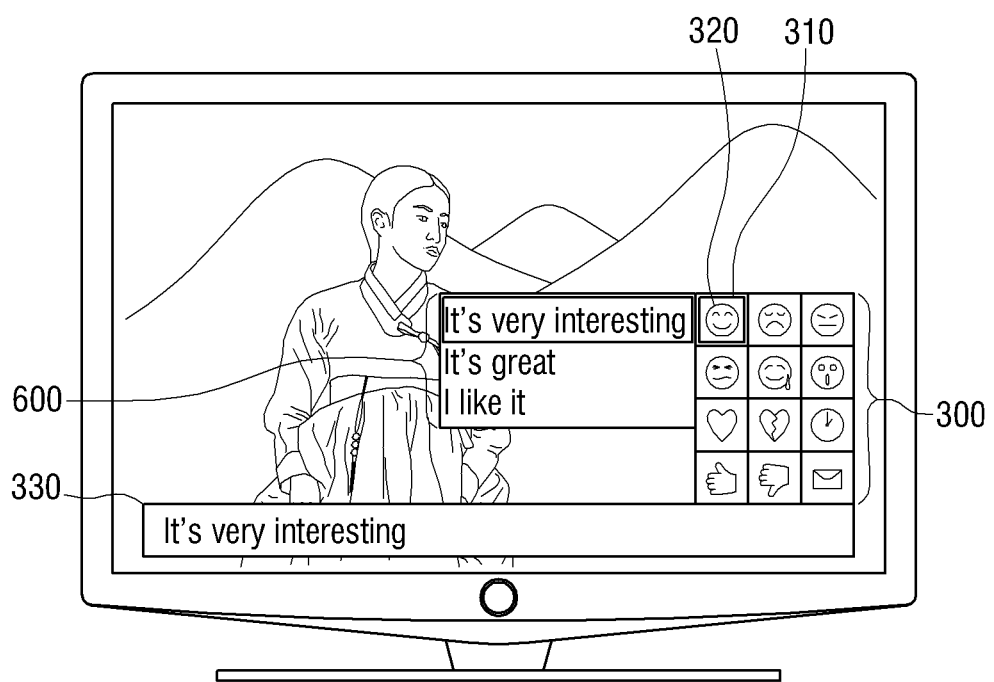
FIG. 6 illustrates a screen on which a plurality of text strings corresponding to a first emoticon are displayed when the first emoticon is selected, according to an exemplary embodiment of the present invention.

FIG. 6 exemplarily illustrates a screen of the TV 100 which displays a plurality of text strings corresponding to the first emoticon 320 when the first emoticon 320 is selected.

As shown in FIG. 6, if the user places the cursor 310 on the first emoticon 320, the TV 100 displays on the screen a text selection window 600 containing a plurality of text strings, namely 'It's very interesting', 'It's great' and 'I like it' which correspond to the first emoticon 320.

Additionally, the text input window 330 displays a text string, which is selected by the user through the text selection window 600. Accordingly, a plurality of text strings may correspond to a single emoticon.

Figure 7:
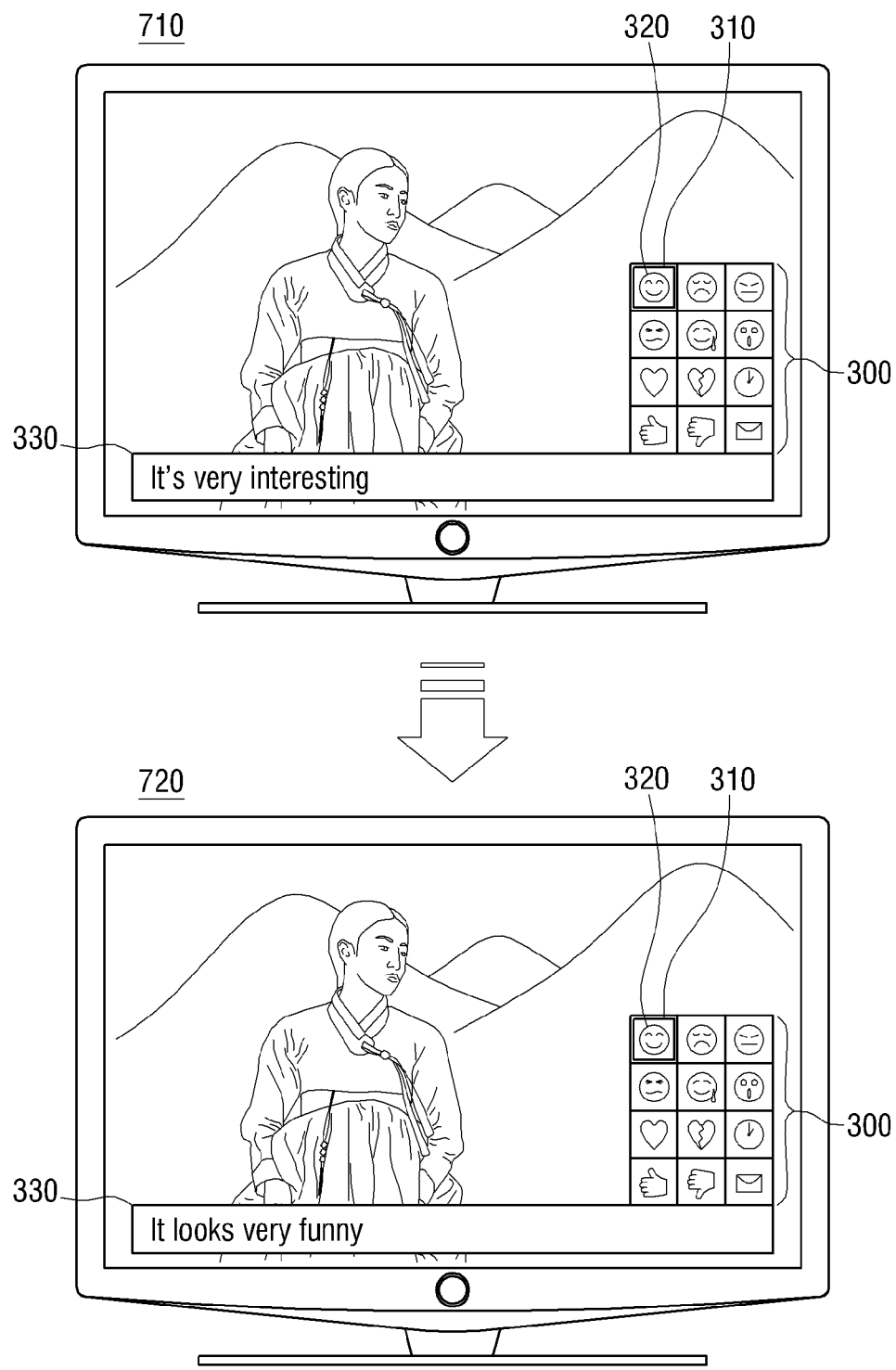
FIG. 7 illustrates a screen on which a text string entered when the first emoticon is selected is edited, according to an exemplary embodiment of the present invention.

FIG. 7 is a view provided to explain a process for editing the text string entered by selecting the first emoticon 320 according to an exemplary embodiment of the present invention.

In FIG. 7, a first screen 710 shows the text string 'It's very interesting' entered in the text input window 330 when the user selects the first emoticon 320. In this situation, if the user edits the text string 'It's very interesting' to read 'It looks very funny' in the text input window 330, a second screen 720 is displayed.

The user edits the text string displayed in the text input window 330 of the first screen 710, and generates a text string displayed in the text input window 330 of the second screen 720, as shown in FIG. 7. Subsequently, the TV 100 additionally stores the edited text string 'It looks very funny' so that the text string 'It looks very funny' may also correspond to the first emoticon 320.

Therefore, if the user selects the first emoticon 320 later, the TV 100 may display the text strings 'It's very interesting' along with 'It looks very funny' in the text selection window 600 of FIG. 6.

Figure 8:
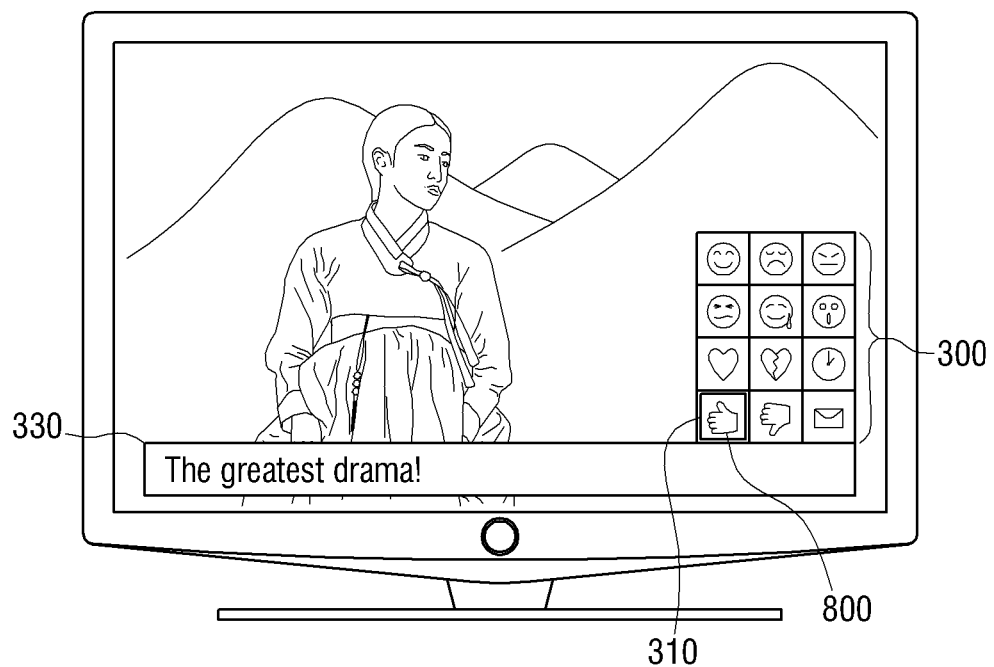
FIG. 8 illustrates a text string entered when a third emoticon is selected while a drama program is being displayed, according to an exemplary embodiment of the present invention.
Figure 9:
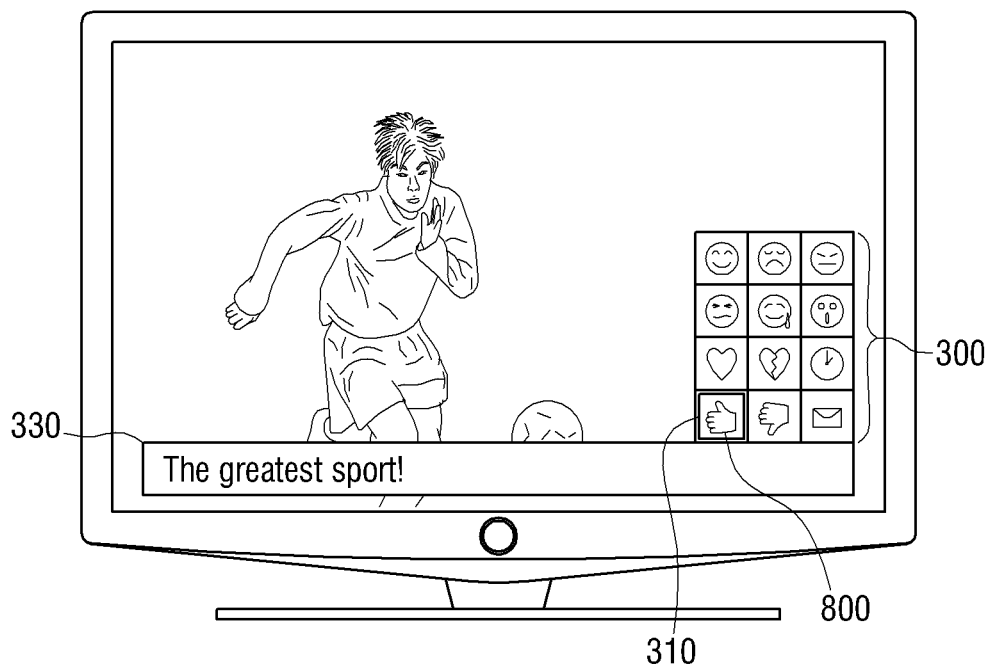
FIG. 9 illustrates a text string entered when a third emoticon is selected while a sports program is being displayed, according to an exemplary embodiment of the present invention.

FIG. 8 exemplarily illustrates a text string entered when a third emoticon 800 is selected while a drama program is being displayed on the TV 100. FIG. 9 exemplarily illustrates a text string entered when the third emoticon 800 is selected while a sports program is being displayed on the TV 100.

As shown in FIGS. 8 and 9, when the user selects the third emoticon 800 while viewing the drama program or the sports program, the text input window 330 of FIG. 8 shows the text string 'The greatest drama!', and the text input window 330 of FIG. 9 shows the text string 'The greatest sport!'

Accordingly, various text strings corresponding to a single emoticon may be entered according to the genre of a currently viewed broadcast program.

Figure 10:
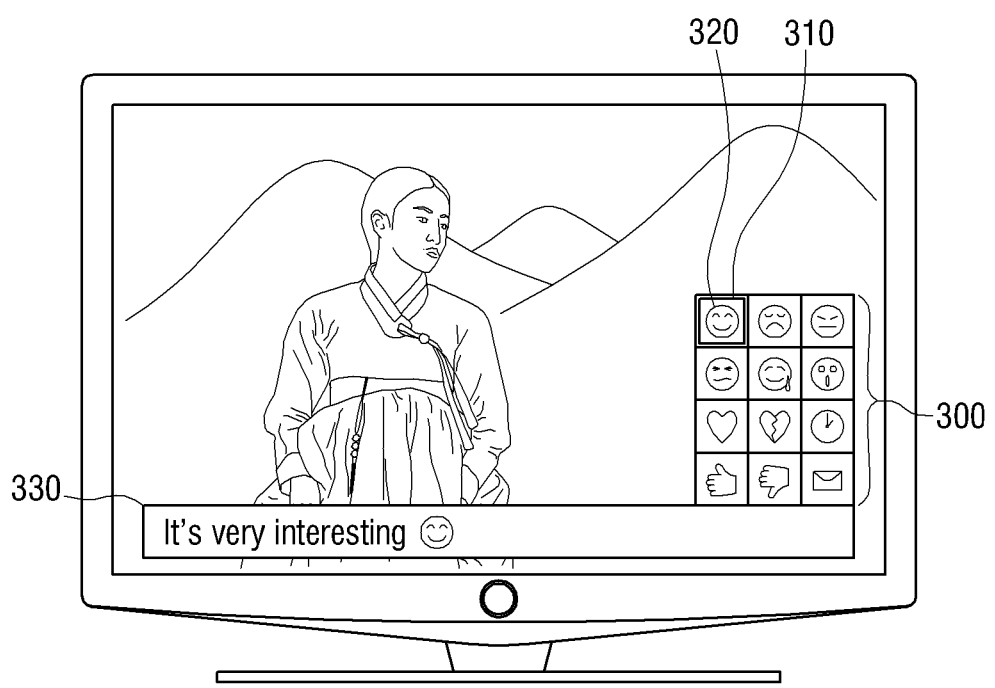
FIG. 10 illustrates a text string displayed along with a selected emoticon, according to an exemplary embodiment of the present invention.

FIG. 10 exemplarily illustrates a screen of the TV 100 which displays a text string along with an emoticon selected by the user.

In FIG. 10, if the user selects the first emoticon 320, the text string 'It's very interesting' is displayed along with the selected first emoticon 320 in the text input window 330.

Accordingly, the TV 100 may display the selected emoticon together with text corresponding to the selected emoticon.

Figure 11:
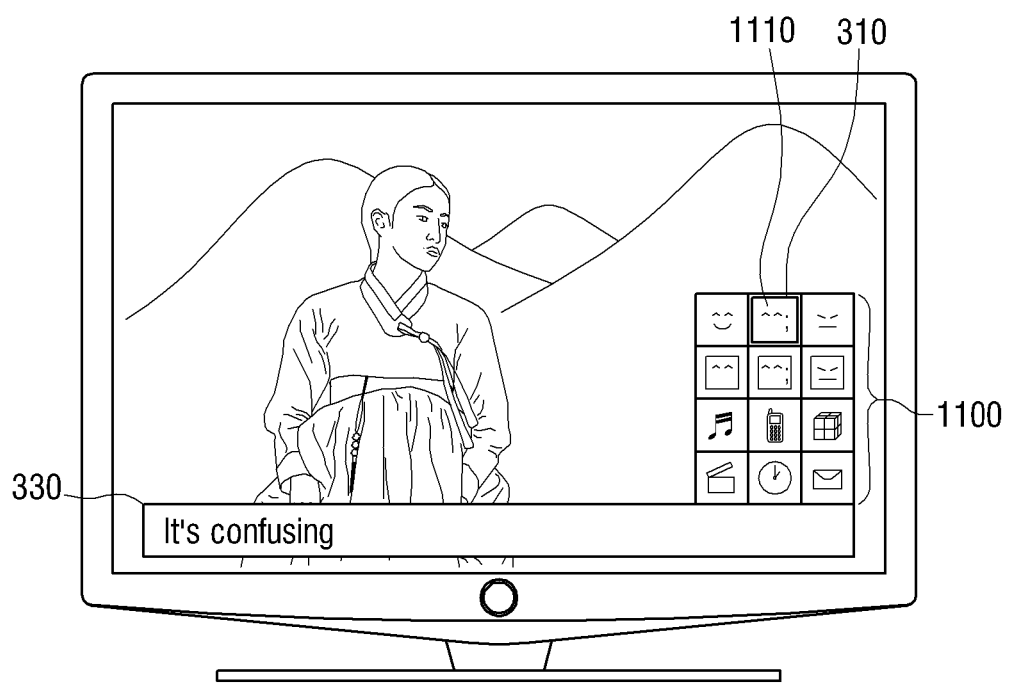
FIG. 11 illustrates a screen which displays an emoticon set different from that shown in FIG. 3 when a TV is used by another user, according to an exemplary embodiment of the present invention.

FIG. 11 exemplarily illustrates a screen of the TV 100 which displays an emoticon set 1100 different from the emoticon set 300 of FIG. 3 when the TV 100 is used by another user.

In the exemplary embodiment of the present invention, FIG. 3 illustrates a situation in which the first user uses the TV 100, and FIG. 11 illustrates a situation in which a third user uses the TV 100. The emoticon set 1100 of FIG. 11 differs from the emoticon set 300 of FIG. 3.

Therefore, it is possible for the TV 100 to provide different emoticon sets for each user, and thus each user may use his or her desired emoticon set.

The TV 100 able to enter text using emoticons has been exemplarily described above with reference to FIGS. 3 to 11 according to the exemplary embodiments of the present invention.

While the text string corresponds to the emoticon in the exemplary embodiments of the present invention, there is no limitation thereto. Accordingly, the present invention is also applicable to a situation, in which the text string corresponds to an image instead of the emoticon and the text string is entered using the image. In this situation, if an image set containing one or more images is displayed and if a user selects one image from the image set, one or more text strings corresponding to the selected image may be displayed on a screen, and a text string selected by the user from among the one or more text strings may be entered. This process for entering a text string using an image may also be applied to a display apparatus.

Additionally, the TV 100 is used as a display apparatus in the exemplary embodiments of the present invention, but the present invention is equally applicable to display apparatuses other than the TV 100, for example a portable multimedia player (PMP), a digital multimedia broadcasting (DMB) receiver or a mobile phone.

As described above, according to exemplary embodiments of the present invention, a method for entering text corresponding to an emoticon selected from an emoticon set, and a display apparatus applying the method are provided, so it is possible for a user to enter text more conveniently.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A text entry method comprising:
    displaying, by a display apparatus, an emoticon set including a plurality of emoticons on a screen;
    selecting an emoticon from the displayed emoticon set;
    displaying, on the screen, a text set corresponding to the selected emoticon in response to the selecting of the emoticon while displaying the plurality of emoticons on the screen;
    selecting a text string among a plurality of text strings included in the displayed text set by placing a cursor over the text string, wherein the text string is displayed at a first position on the screen; and
    in response to the selection of the text string displayed at the first position, displaying the selected text string on a text input window of the screen while displaying the plurality of emoticons on the screen,
    wherein the selected text string on the text input window is displayed at a second position on the screen different from the first position on the screen.

2. The text entry method as claimed in claim 1, wherein each of the plurality of text strings is user editable, and is downloaded via a network.

3. The text entry method as claimed in claim 1, further comprising:
    displaying a cursor inside the emoticon set; and
    displaying a text string corresponding to an emoticon referred to by the cursor on the screen.

4. The text entry method as claimed in claim 1, further comprising:
    if when the displayed text string is edited, storing the edited text string and associating the edited text string with the selected emoticon.

5. The text entry method as claimed in claim 1, further comprising:
    storing a plurality of emoticon sets of the plurality of users, the plurality of emoticon sets including the displayed emoticon set,
    wherein the displaying the emoticon set comprises displaying an emoticon set of a current user.

6. The text entry method as claimed in claim 1, wherein the plurality of text strings are of a current user.

7. The text entry method as claimed in claim 1, further comprising:
    receiving broadcast information; and
    extracting genre information of a broadcast program from the broadcast information,
    wherein the text string corresponds to the genre information and the selected emoticon.

8. The text entry method as claimed in claim 1, further comprises determining the selected emoticon and the text string corresponding to the selected emoticon.

9. The text entry method as claimed in claim 1, further comprising:
    receiving data regarding the selected emoticon and data regarding the plurality of text strings via a network.

10. A display apparatus comprising:
    a display unit which displays an emoticon set including a plurality of emoticons on a screen;
    a controller which, when an emoticon is selected from the displayed emoticon set, controls the display unit to display a text set corresponding to the selected emoticon on the screen in response to the selecting of the emoticon while the plurality of emoticons are displayed on the screen, and, when a text string displayed at a first position on the screen is selected among a plurality of text strings included in the displayed text set by placing a cursor over the text string, controls the display unit to display the selected text string on a text input window of the screen while the plurality of emoticons are displayed on the screen, wherein the selected text string on the text input window is displayed at a second position on the screen different from the first position on the screen.

11. The display apparatus as claimed in claim 10, wherein each of the plurality of text strings is user editable and is downloaded via a network.

12. The display apparatus as claimed in claim 10, wherein the controller controls so that a cursor can be displayed inside the emoticon set and a text string corresponding to an emoticon referred to by the cursor can be displayed on the screen.

13. The display apparatus as claimed in claim 10, wherein when the displayed text string is edited, the controller associates the edited text string with the selected emoticon.

14. The display apparatus as claimed in claim 10, further comprising:
    a storage unit which stores a plurality of emoticon sets of the plurality of users, the plurality of emoticon sets including the emoticon set,
    wherein the controller controls the emoticon set for a current user to be displayed.

15. The display apparatus as claimed in claim 10, wherein the plurality of text strings correspond to the selected emoticon for a current user.

16. The display apparatus as claimed in claim 10, further comprising:
    a broadcast receiver which receives broadcast information,
    wherein the controller extracts genre information of a broadcast program, from the broadcast information, and controls the display unit to display a text string which corresponds to the genre information and the selected emoticon.

17. The display apparatus as claimed in claim 10, wherein the controller determines a text string corresponding to the selected emoticon.

18. The display apparatus as claimed in claim 10, further comprising:
    a network interface which receives data regarding the selected emoticon and data regarding the plurality of text strings via a network.

19. A text entry method comprising:

displaying, by a display apparatus, an image set containing at least one image on a screen;

selecting an image from the at least one image of the image set;

displaying, on the screen, a text set corresponding to the selected image in response to the selecting of the image while displaying the at least one image on the screen;

selecting a text string among a plurality of text strings included in the displayed text set by placing a cursor over the text string, wherein the text string is displayed at a first position on the screen; and in response to the selection of the text string displayed at the first position, displaying the selected text string on a text input window of the screen while displaying the at least one image on the screen, wherein the selected text string on the text input window is displayed at a second position on the screen different from the first position on the screen.

20. A display apparatus comprising:

a display unit which displays an image set containing at least one image on a screen;

a controller which, when an image is selected from the at least one image of the image set, controls the display unit to display a text set corresponding to the selected image on the screen in response to the selecting of the image while the at least one image is displayed on the screen, and which, when a text string displayed at a first position on the screen is selected among a plurality of text strings included in the displayed text set by placing a cursor over the text string, controls the display unit to display the selected text string on a text input window of the screen while the at least one image is displayed on the screen, wherein the selected text string on the text input window is displayed at a second position on the screen different from the first position on the screen.

21. The method as claimed in claim 1, wherein the emoticon set is displayed differently to correspond to each of the plurality of users.

22. The method as claimed in claim 1, further comprising receiving and displaying a broadcast program, wherein the emoticon set and the text input window are displayed on the displayed broadcast program.

\* \* \* \* \*